United States Patent [19]

Subramanian et al.

[11] Patent Number: 5,176,887
[45] Date of Patent: Jan. 5, 1993

[54] TREATING EMISSIONS FROM ENGINES FUELED BY COMPRESSED NATURAL GAS

[75] Inventors: Somasundaram Subramanian, Melvindale, Mich.; William L. H. Watkins, Toledo, Ohio; Mohinder S. Chattha, Northville, Mich.

[73] Assignee: Ford Motor Company, Dearborn, Mich.

[21] Appl. No.: 772,317

[22] Filed: Oct. 7, 1991

[51] Int. Cl.[5] .......................... B01J 8/02; C01B 21/00
[52] U.S. Cl. .................................. 423/213.2; 423/239
[58] Field of Search ............ 423/239, 239 A, 210 US, 423/213.2

[56] References Cited

U.S. PATENT DOCUMENTS 4,906,176 3/1990 Yamashita et al.
4,919,902 4/1990 Bricker et al. ....................... 423/210

FOREIGN PATENT DOCUMENTS 62-241554 10/1987 Japan .................................... 423/239

OTHER PUBLICATIONS

Cullis et al, Journal of Catalysis, vol. 83, p. 267, 1983.
Drozdov et al, Reaction Kinetic Catalysis Ltrs., vol. 27, p. 425, 1985.
Stein et al Bureau of Mines Bulletin, No. 608, U.S. Gov. Printing Office.
Anderson et al, Industrial Engineering Chemistry, vol. 53, p. 809, 1961.
Muraki, "Performance of Palladium Automotive Catalyst", SAE 910842, 1991.
Muraki et al, "Palladium–Lanthanum Catalysts for Automotive Emission Control", Ind. Eng. Chem. Prod. Res. Dev., 25, 1986, 202–208.

*Primary Examiner*—Gregory A. Heller
*Attorney, Agent, or Firm*—Joseph W. Malleck; Roger L. May

[57] ABSTRACT

A three-way catalyst system for treating the exhaust stream of a compressed natural gas (CNG) fueled engine operating slightly rich of stoichiometry, the said catalyst system providing high conversions and low light-off temperature for the remnoval of HC, CO, and $NO_x$. A high surface area gamma alumina support is impregnated with an intimate mixture of 0.2–30% Pd and 0.5–20% $La_2O_3$, the Pd being in crystalline form with a particle size in the range of 5-500 angstroms.

A method of making such catalyst system comprising sequentially impregnating a high surface area gamma alumina support with lanthana and palladium by incipient wetness techniques, such techniques comprising the procedure of contacting alumina first with a lanthanum nitrate solution of desired concentration to obtain 0.5–20% lanthana, contacting the lanthana impregnated alumina with a palladium nitrate solution of desired concentration to obtain a 0.2–30% palladium content in the catalyst, each of said steps being separated by drying and calcination.

A method of treating exhaust gas from a CNG fueled engine with the catalyst system described above, comprising: (a) operating said engine at slightly rich of stoichiometry; (b) exposing such catalyst to the exhaust gases in the range of 400°–750° C. and at a space velocity in the range of 0–100 K $hr^{-1}$, said exhaust gas being converted at an efficiency greater than 90% for each of NO, CO, and $CH_4$.

7 Claims, 6 Drawing Sheets

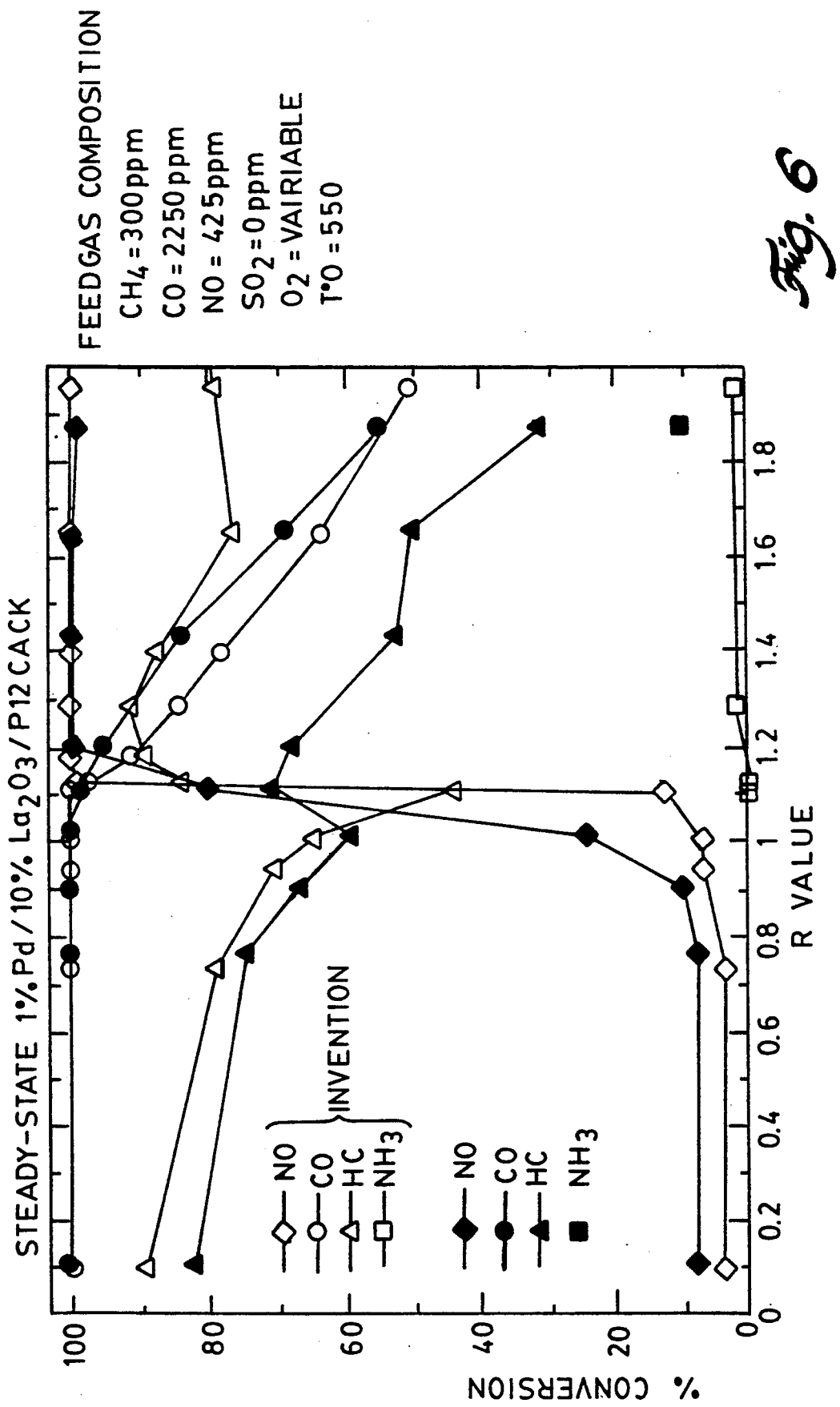

TREATING EMISSIONS FROM ENGINES FUELED BY COMPRESSED NATURAL GAS

BACKGROUND OF THE INVENTION

1. Technical field

This invention relates to the technology of catalytically converting emissions of a compressed natural gas (CNG) fueled engine, and more particularly to catalytic conversion of exhaust gases containing saturated hydrocarbons, including methane.

2. Discussion of the Prior Art

Natural gas (essentially 85% methane) is an attractive source of fuel for vehicles because it provides for a lower fuel cost, longer engine life, lower maintenance, and reduced oil consumption. Development of catalysts for high efficiency removal of saturated hydrocarbons, including methane, by oxidation within an exhaust stream is of strategic importance; it may be crucial in view of the emission control requirements promulgated by the U.S. Government. In the past, oxidation of methane has received little attention in automotive catalysis. Extreme difficulty of removal of methane is experienced because a C-H bond must be ruptured. In the oxidation of higher alkanes, oxidation is easily achieved by the cleavage of C-C bonds. Since the C-H bond is stronger, methane is more difficult to oxidize.

The prior art has investigated the use of noble metals and base metals as catalysts for stimulating the oxidation of methane by cleavage of the C-H bond. Alumina, silica, thoria, and titania supported platinum and palladium catalysts were evaluated in 1983 and 1985 (see C. F. Cullis and B. M. Willatt, Journal of Catalysis, Vol. 83, p. 267, 1983; and V. A. Drozdov, P. G. Tsyrulnikov, V. V. Popovskii, N. N. Bulgakov, E. M. Moroz, and T. G. Galeev, Reaction Kinetic Catalysis Letters, Vol. 27, p. 425, 1985). These studies showed that an alumina supported palladium catalyst is the most active, followed by an alumina supported platinum catalyst. A reduction in catalytic activity is observed when silica and titania are used as supports. A systematic study of the use of alumina supported base metal catalysts for methane oxidation was conducted in 1963; chromium was found to be the most active. At a metal loading of 3.1 weight percent, chromium was found to be comparable to palladium (see K. C. Stein, J. J. Feenan, L. J. Hofer, and R. B. Anderson, Bureau of Mines Bulletin, No. 608, U.S. Government Printing Office). However, use of only $Cr_2O_3$ on $Al_2O_3$ is disadvantageous because of the volatile and toxic nature of $Cr_2O_3$ and the poor durability of the $Cr_2O_3-Al_2O_3$ catalyst. In another article evaluating base metal catalysts for methane oxidation, unsupported $Co_3O_4$ was found most active (see R. B. Anderson, K. C. Stein, J. J. Feenan, and L. J. Hofer, Industrial Engineering Chemistry, Vol. 53, p. 809, 1961). However, use of only $Co_3O_4$ on $Al_2O_3$ is disadvantageous because of the volatile and toxic nature of $Co_3O_4$ and the tendency of Co to form a low surface area spinel with $Al_2O_3$ resulting in poor durability.

The prior art has found that the deactivation of a palladium on alumina catalyst can occur by the reaction of water vapor with palladium oxide to form $Pd(OH)_2$. It is desirable to retard the mobility of the adsorbed water vapor species and thereby reduce $Pd(OH)_2$ formation. Such prior art has also found that palladium oxide is less active than palladium, and therefore it is desirable to retain palladium in the metallic state and inhibit the formation of palladium oxide.

In the course of examining Pd on $Al_2O_3$ at an effective three-way catalyst (converting methane, CO and $NO_x$), the prior art has demonstrated a negative teaching to the use of lanthana with palladium (see H. Muraki, "Performance of Palladium Automotive Catalyst", SAE Technical Paper Series No. 910842, 1991). This work resulted in a conclusion that total hydrocarbon conversion of CH4, being the most difficult hydrocarbon to oxidize, by palladium/lanthanum catalysts, near stoichiometric conditions, is lower than that of a palladium catalyst by itself; $La_2O_3$ is believed to suppress hydrocarbon oxidation activity. The prior art has also demonstrated that the use of $La_2O_3$ with palladium increases the hydrocarbon light-off temperature (see H. Muraki et al, "Palladium-Lanthanum Catalysts for Automotive Emission Control", Ind. Eng. Chem. Prod. Res. Dev., 25 (1986) 202-208).

Lanthana has been used by the prior art with Pd/Al$_O_3$ catalysts in ways not related to catalyst conversion enhancement, namely, to thermally stabilize the alumina support (see U.S. Pat. No. 4,906,176). This patent teaches the use of other catalytic components, i.e., manganese, chromium, zirconium, rare earth elements, tin, zinc, copper, magnesium, barium, strontium, and calcium to promote catalytic activity. However, patent '176 fails to appreciate the conversion enhancement role $La_2O_3$ may play during $CH_4$ oxidation because the disclosure used the wrong and undesirable form of oxide support (i.e., $La_2O_3.11Al_2O_3$), the lanthana was not deposited correctly, operated under generally lean conditions, and never measured the conversion efficiency attained using the above catalyst because of their primary interest in measuring thermal stability.

SUMMARY OF THE INVENTION

The invention pertains to a three-way catalyst system for heating the exhaust of a compressed natural gas fueled engine operated slightly rich of stoichiometry. This catalyst system achieves simultaneous removal of saturated hydrocarbons, particularly methane, nitric oxide, and carbon monoxide at enhanced rates. Also, the light-off temperatures are lower. The catalyst system comprises a high surface area gamma alumina support impregnated with an intimate mixture of 0.2-30% palladium and 0.5-20% lanthana, the palladium being in a crystalline form and having a particle size in the range of 5 to 1000 angstroms. The intimate presence of $La_2O_3$ permits Pd to adsorb $CH_4$ and $O_2$ instead of Pd becoming oxidized.

The intimate mixture is assured by providing a substantially continuous contact between the palladium and lanthana. The exhaust gas composition is slightly rich of stoichiometry), preferably in the redox ratio, R, range of 1.1-1.2 (R being the ratio of reducing components to oxidizing components in the exhaust gas. Enhanced oxidation rate for methane by use of this invention allows conversions greater than 90% when the exhaust gas is maintained in the temperature range of 400-750° C., and at a space velocity of 5-100K hr$^{-1}$. The light-off temperature for methane (at 50% conversion) is no greater than 450° C. and can be as low as 300° C.

The catalyst of this invention has also achieved increased aging resistance by retaining a $CH_4$ conversion efficiency at or above 80% after 100 hours at 550° C.

Other aspects of this invention comprise a method of making such catalyst and a method of treating CNG emissions. The method of making involves: (a) sequentially impregnating gamma alumina with lanthanum and palladium by incipient wetness techniques that involve contacting a desired amount of alumina first with a lanthanum nitrate solution of desired concentration to obtain 0.5-20% lanthana by weight of the catalyst and thereafter contacting the lanthana impregnated alumina with a palladium nitrate solution of desired concentration to obtain a 0.2-30% palladium content in the catalyst, the impregnated alumina, after each stage of impregnation, being dried and calcined prior to the next stage. The method of treating comprises: (a) stoichiometry; and (b) exposing a catalyst constituted of a high surface area gamma alumina support impregnated with an intimate mixture of 0.5-20% $La_2O_3$ and 0.2-30% Pd, to exhaust gases in the range of 400°-750° C., and at a space velocity of 5-100K $hr^{-1}$, the exhaust gas being converted at an efficiency greater than 90% for each of NO, CO, and $CH_4$.

BRIEF DESCRIPTION OF THE DRAWINGS

FIG. 6 is a graphical illustration of the conversion efficiency as a function of the redox ratio using simulated CNG emissions; this illustrates the difference in $CH_4$, CO, and NO conversion efficiency resulting from the addition of La to a $Pd/Al_2O_3$ catalyst.

DETAILED DESCRIPTION AND BEST MODE

Figure 1:
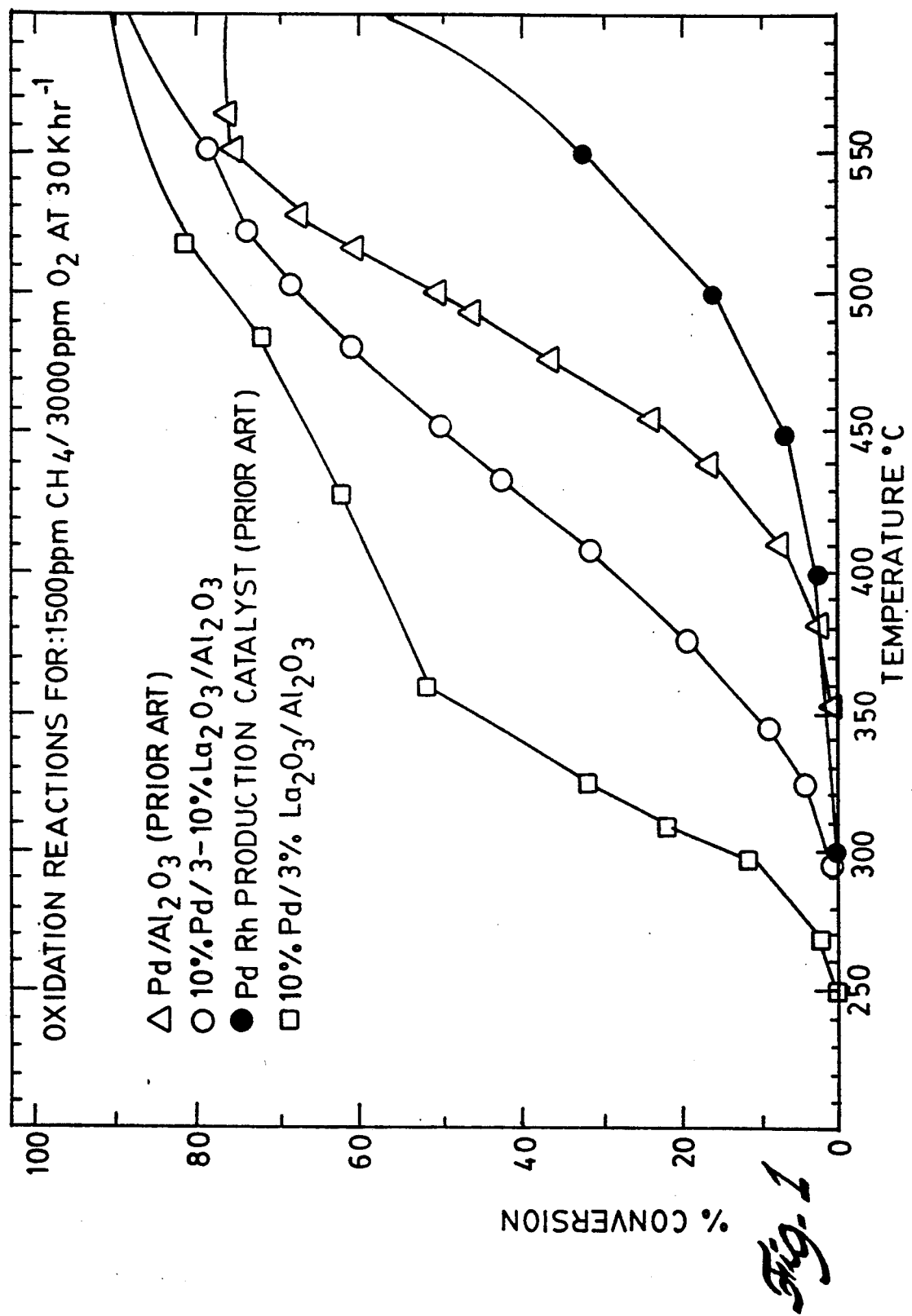
FIG. 1 is a graphical illustration of oxidation efficiency of different catalysts, including the catalyst of this invention, as a function of temperature to provide light-off information for oxidation of methane.

The catalyst functions three-way (CO, HC, and NO) to cleanse the exhaust of a CNG fueled internal combustion engine when operated under slightly rich conditions, although such catalyst system can be used to convert HC and CO from any (fuel-lean or stoichiometric) gaseous stream that contains saturated hydrocarbons, particularly methane, provided the gas stream is maintained in a desired temperature range. When used for cleansing the automotive exhaust of a CNG fueled engine, such catalyst system will provide a lower light-off temperature compared to the prior art catalysts and will provide methane conversion equal to or greater than 90% at slightly rich conditions.

The catalyst is comprised of a high surface area gamma alumina support impregnated with 0.5-20% lanthanum oxide ($La_2O_3$) and 0.2-30% palladium, by weight of the catalyst.

The exhaust, which this catalyst is designed to treat, is slightly rich and contains saturated hydrocarbons, particularly methane. This means that the redox ratio R is generally in the range of 1.1-1.2, although the catalyst will perform with less efficiency at redox ratios outside such range. The temperature of such an exhaust gas should be in the range of 400°-750° C. in order to obtain optimum methane conversion, such temperature being reached during normal operating conditions rather than during start-up of the engine. Optimum conversion is facilitated when the catalyst has a space velocity in the range of 2-100K $hr^{-1}$. At space velocities outside of this range, the conversion efficiency of the catalyst will be detrimentally affected. Methane conversion is lowered particularly when the space velocity increases; however, CO and NO conversions are not significantly affected when the space velocity increases above 100K hr The exhaust gas from a CNG fueled engine will typically have a hydrocarbon content in the range of 60-3000 ppm, a CO content in the range of 450-22,500 ppm, a NO content in the range of 85-4250 ppm, and a $H_2$ content in the range of 150-7500 ppm. Oxygen will generally be about 320-16,000 ppm. To simulate such an exhaust gas, the ratio of hydrogen to CO should be in the range of 0.25-0.75.

The support must be of gamma alumina rather than delta or alpha forms of alumina because delta and alpha forms of alumina have, among other factors, low surface areas. With gamma alumina, the surface area will be significantly increased and be in the range of about 50-400 $m^2/gm$. The particle size of the gamma alumina should be less than 200 angstroms, and the monolith carrier should have a cell size in the range of 100-600 cells per square inch. Gamma alumina may also be modified with oxides of base, rare earth and alkali metals such as barium, cerium, titanium, and nickel.

The lanthana impregnation is carried out to load the support with lanthana in the weight range of 0.5-20%. If lanthana is added in an amount less than such range, then the beneficial effect of increase in activity due to lanthana addition is not observed. If lanthana exceeds such range, then the lanthana surface area decreases and no additional benefit is derived. Lanthana, as used herein, provides a unique chemical union with the palladium metal to obviate or delay the oxidation of the palladium and thereby leads to a synergistic relationship for catalysis. Elements that are equivalent to the function of lanthana for purposes of this invention may include tungsten oxide and molybdenum oxide.

Palladium is impregnated in a manner to provide the presence of large crystalline particles, preferably in the particle range of 5-1000 angstroms. With palladium weight loadings below 0.2%, there will be an insufficient catalysis effect and therefore not promote the objects of this invention. If the palladium loading is in excess of 30%, the palladium surface area decreases and no additional benefit from palladium addition is derived.

Other elements that may be present in the catalytic impregnation may include elements that avoid retention of water for improving the long life stability of catalysts. This may include elements such as tungsten oxide (incorporated by using ammonium meta tungstate during the impregnation process) or chromium oxide, both of which tend to prevent oxidation of palladium by reducing the mobility of water and thereby keeping it away from the palladium.

Some of the chemical reactions that take place as a result of using the catalyst of this invention are indicated below:

$$CH_4 + 2O_2 \rightarrow CO_2 + 2H_2O$$

$$CO + 1/2 O_2 \rightarrow CO_2$$

$$H_2 + 1/2 O_2 \rightarrow H_2O$$

In additional to these steps, several reactions such as those between $CH_4$ and NO, CO and NO, and NO and $H_2$ occur. The stoichiometric reactions are complicated and vary with exhaust gas composition.

Performance

As shown in FIG. 1, the $Pd/La_2O_3/Al_2O_3$ catalyst of this invention is compared with prior art catalysts to indicate the improvement in light-off characteristics when operating on the exhaust gas from a CNG fueled engine. Light-off temperature is that temperature at which 50% conversion efficiency is achieved. The flow study used a simulated exhaust gas having 1500 ppm $CH_4$, 3000 ppm $O_2$, and balance of $N_2$ (at 30K $hr^{-1}$ SV).

The temperature obtained for light-off using a 1% palladium and 3-10% lanthanum catalyst was about 440°-445° C.; when the palladium was increased to as much as 10% with 3% lanthana, the light-off temperature occurred as low as 340° C. This is in striking contrast to the light-off temperatures for the prior art catalysts which range from 490°-580° C.

Figure 2:
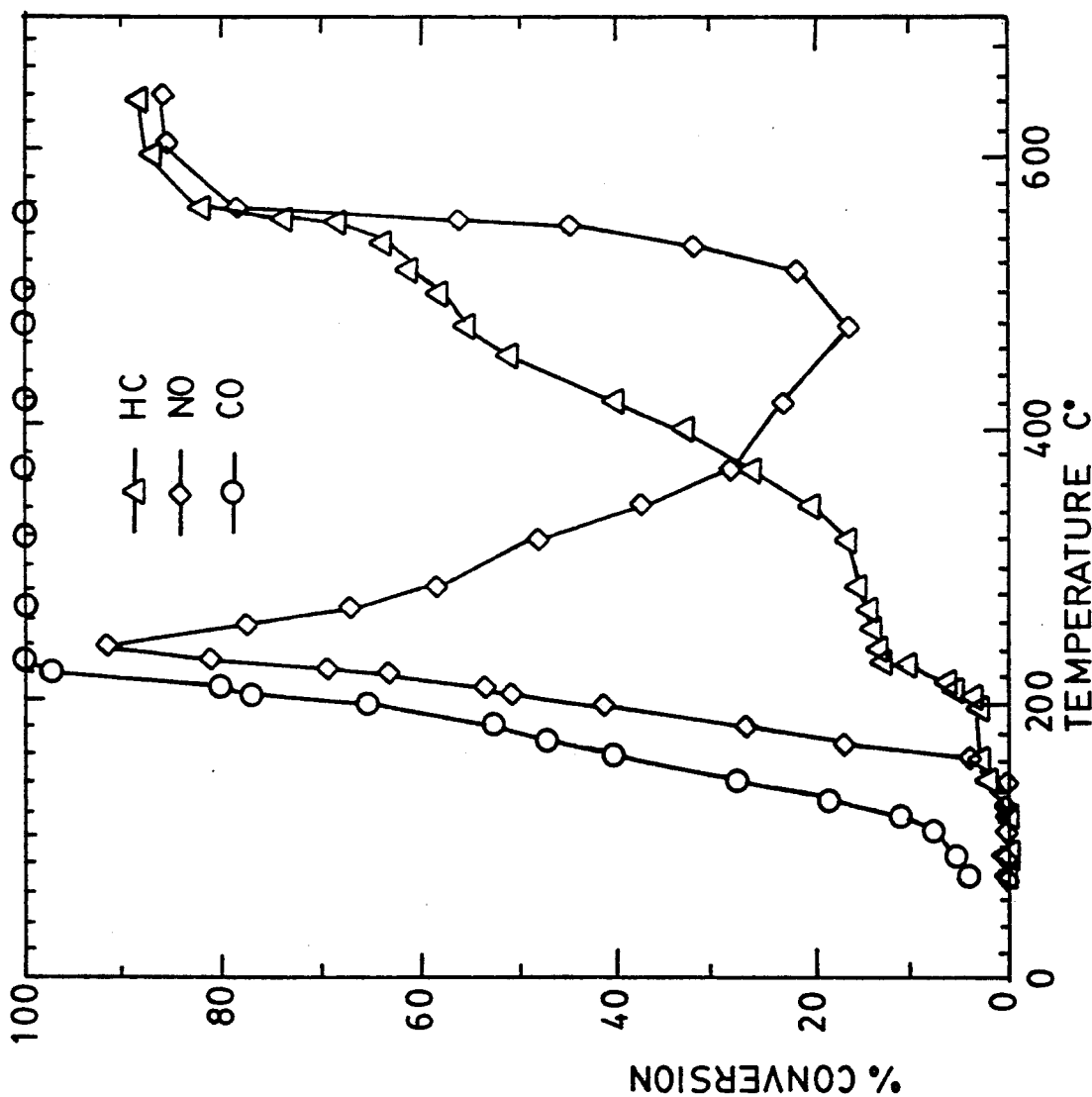
FIG. 2 is a graphical illustration of conversion efficiency as a function of temperature for the catalyst of this invention; it illustrates the conversion efficiency for the various gaseous species using a gas that simulates emissions from a CNG engine.

FIG. 2 shows the light-off characteristics for methane, carbon monoxide, and nitric oxide when the invented catalyst is used for treating the simulated CNG vehicle exhaust mixture. The light-off temperature for $CH_4$, NO, and CO are 450° C., 205° C., and 170° C., respectively, when the redox ratio is 1.15. As shown in FIG. 2, the optimum temperature for achieving maximum methane conversion is in the range of 550°-650° C. for the invented catalyst herein. Thus, the catalyst of this invention achieves extremely high three-way conversion efficiencies when operated in such temperature range and at a redox ratio (slightly rich) around 1.15. Under similar conditions, the light-off temperatures for the invented catalyst are lower than those of the Pd/Rh prior art catalyst.

Figure 3:
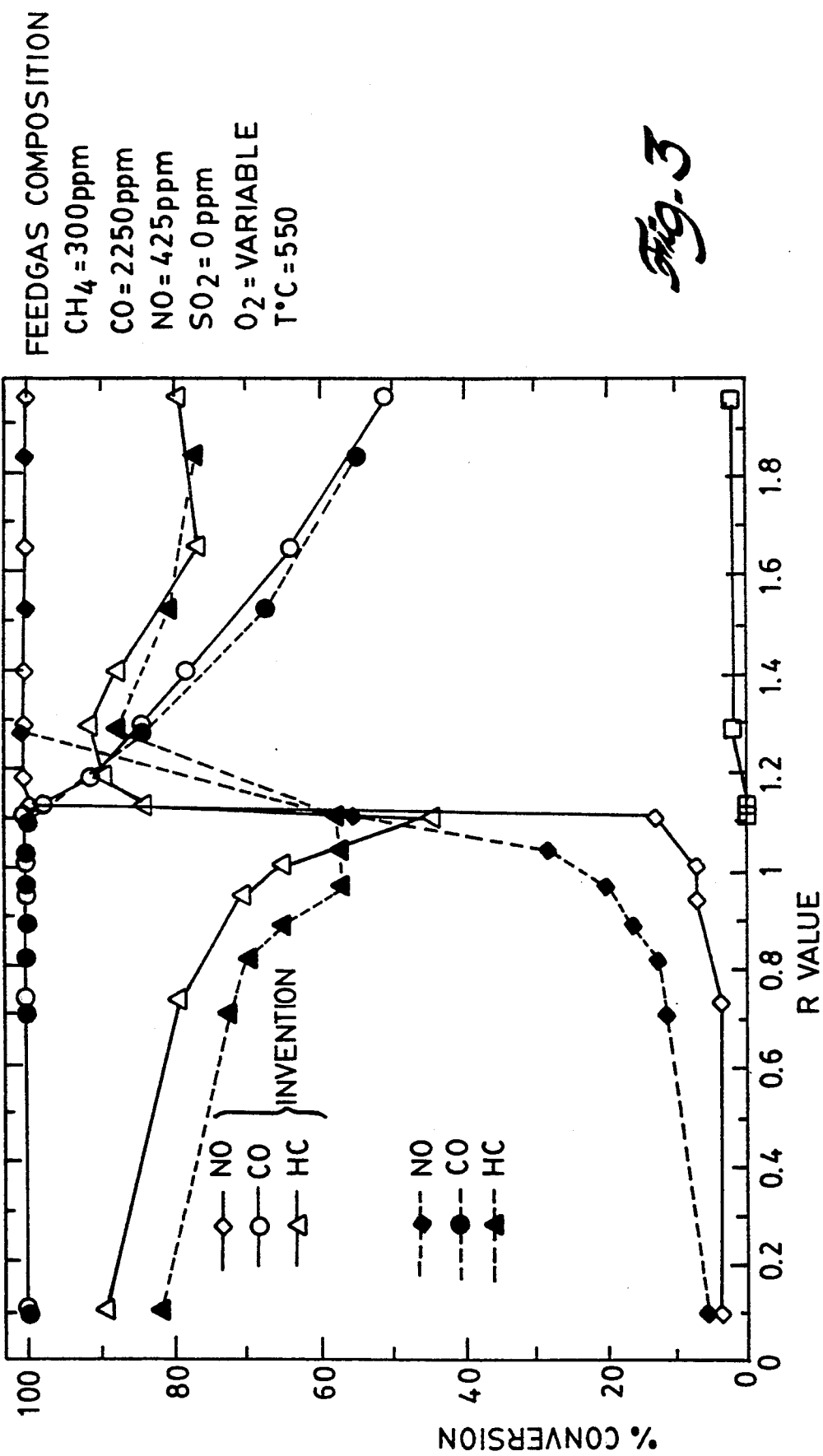
FIG. 3 is a graphical illustration of conversion efficiency as a function of redox ratio using simulated CNG emissions; this illustrates the difference in methane, CO, and NO conversion efficiency for an embodiment of this invention compared to a palladium/rhodium prior art catalyst.

As shown in FIG. 3, all of NO, CO, and methane will be converted at a level equal to or greater than 90% when such conditions are met (temperature 550°-650° C, R=1.1-1.2) and the catalyst of this invention is deployed. The optimum methane conversion efficiency obtained when the prior art catalyst (palladium/rhodium shown in broken line and solid symbols) is employed does not exceed 70% at a redox ratio of about 1.2; this is substantially lower than about 90% achieved by the catalyst of this invention. Equally important is the conversion of NO which drops to about 80% for the prior art catalyst (palladium/rhodium) at a redox ratio of about 1.2; a conversion efficiency of about 100% for NO is achieved when using the catalyst of this invention.

Figure 4:
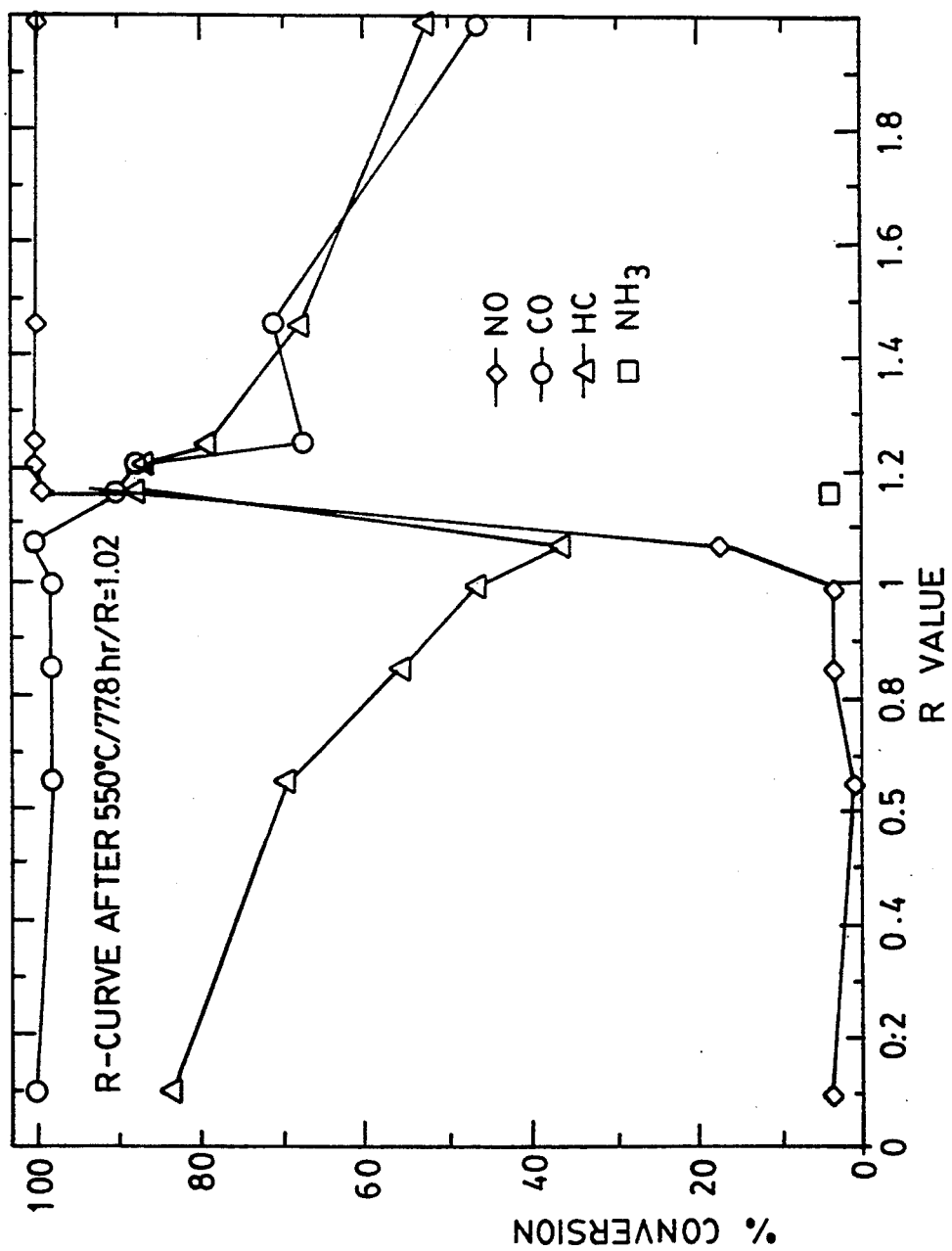
FIGS. 4 and 5 are graphical illustrations similar to that of FIG. 3, but illustrating the effects of aging after about 80 and 100 hours, respectively, of use of the catalyst of this invention.
Figure 5:
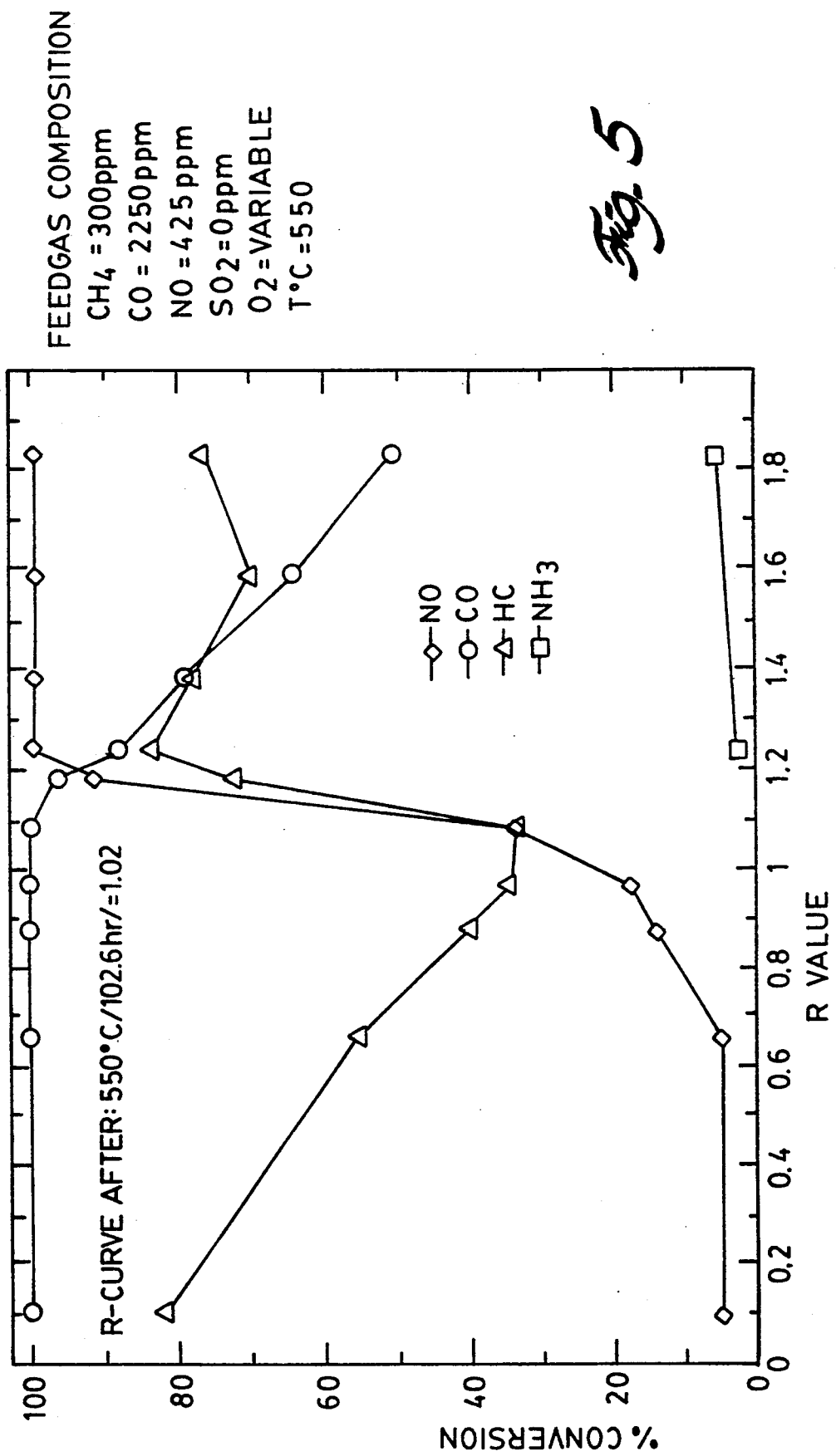

An examination was made of the aging characteristics of the catalyst of this invention after a period of about 80 hours at 550° C at a redox ratio of 1.02 (FIG. 4) and after about 100 hours (FIG. 5). Methane conversion efficiency dropped only about 3% from that for a fresh catalyst; and as shown in FIG. 5, the conversion efficiency for methane dropped only an additional 2-5% when aging was carried out for about 100 hours at the same temperature and redox ratio. This is a significant improvement in resistance to aging.

Comparison of the conversion efficiencies for $CH_4$ reported for $Pd/La_2O_3/Al_2O_3$ and $Pd/Al_2O_3$ catalysts (FIG. 6) shows that the $CH_4$ conversion for the former is approximately 30% higher in the redox ratio window 1.2 to 1.4. The NO conversion for the two catalysts is comparable. The addition of $La_2O_3$ lowers the CO conversion by about 7% when R is between 1.2 and 1.4.

This invention also provides a method of making a catalyst system in order to obtain optimum methane conversion for the treatment of the exhaust from a CNG fueled internal combustion engine. This comprises the steps of sequentially impregnating a gamma alumina support with lanthana and palladium by incipient wetness. This included: (a) contacting an amount of $Al_2O_3$ first with lanthanum nitrate solution of desired concentration to obtain 0.5-20% lanthana by weight of the catalyst and thereafter contacting the lanthana impregnated alumina with a palladium nitrate solution of desired concentration to obtain a 0.2-30% (by weight of the catalyst) palladium loading, the first and second stages of this method being separately followed by drying and calcination.

Lanthanum nitrate may be substituted by use of other lanthanum compounds soluble in water, acids, and organic solvents, examples of which include lanthanum isopropoxide, lanthanum oxalate, lanthanum acetate, lanthanum halides, lanthanum hydroxide, lanthanum carbonate. The palladium nitrate solution may be substituted by other palladium compounds such as palladium chloride, palladium acetate, palladium 2.4 pentane dionate, that are soluble in either polar or nonpolar solvents. Drying is preferably carried out at a temperature of 100° C. (373K) for about one hour and calcination is preferably carried out at a temperature of 600° C. (873K) for about six hours. It is desirable that the method be one in which the impregnations are sequential although simultaneous impregnation may also be carried out, but the latter leads to coverage of active Pd metal by amorphous $La_2O_3$ and this leads to lower activity.

In most of the examples used to generate data for FIGS. 1-6, the catalyst of this invention was made by contacting 5 grams of alumina with 6 cc's of lanthanum nitrate solution of desired concentration. The resulting precursor was dried at 100° C. for one hour and calcined at 600° C. for six hours to form a 10% $La_2O_3/Al_2O_3$ composite oxide. Five grams of such composite oxide were contacted with 6 cc's of palladium nitrate solution of desired concentration to obtain a 1% $Pd/10\%$ $La_2O_3/Al_2O_3$ precursor. The latter precursor was dried at 100° C. for one hour and calcined at 600° C. for six hours to form the catalyst.

This invention also comprehends a method of treating exhaust gas from a CNG fueled engine with the catalyst system of claim 1, comprising: (a) operation of said engine at slightly rich of stoichiometry; (b) exposing such catalyst to the exhaust gases in the range of 400°-750° C. and at a space velocity in the range of 2-100K $hr^{-1}$, said exhaust gas being converted at an efficiency greater than 90% for each of NO, CO, and $CH_4$. It may also be possible to close-couple this catalyst to the engine to ensure the exposure to exhaust gases in the temperature range of 400°-750° C. so that the time required to attain the light-off temperature is shortened. This results in lower tail pipe emissions.

We claim:

1. A method of treating exhaust gas containing $NO_x$, CO, and $CH_4$ from a CNG fueled engine, comprising:
   (a) operating said engine fueled with CNG at slightly rich of stoichiometry;
   (b) exposing a catalyst, comprised of 0.2-30 wt. % Pd and 0.5-20 wt. % $La_2O_3$ supported on gamma $Al_2O_3$, to such exhaust gases int eh range of 400°-750° C. and at a space velocity in the range of 2-100K $hr^{-1}$, said exhaust gas being converted at an efficiency greater than 90% for each of $NO_x$, CO, and $CH_4$.

2. The method of treating as in claim 1, in which said catalyst is close-coupled to said engine to provide a shorter light-off time and thereby lower tail pipe emissions.

3. The method of treating as in claim 1, in which said method is carried out for at least 100 hours at temperatures up to 750° C. while preventing degradation of conversion efficiency for $CH_4$ by no more than 3%.

4. The method of treating as in claim 2, in which the light-off temperature for $CH_4$ is lower than 450° C.

5. The method as in claim 1, in which said catalyst is comprised of Pd in crystalline particle form.

6. The method as in claim 11, in which said Pd crystalline particle size is b 5-1000 angstroms.

7. The method as in claim 1, in which the particle size of the $Al_2O_3$ in said catalyst is less than 200 angstroms.

* * * * *